(12) United States Patent
Kearns et al.

(10) Patent No.: US 12,339,443 B2
(45) Date of Patent: Jun. 24, 2025

(54) ASSEMBLY FOR AN EYE TRACKING SYSTEM AND A CORRESPONDING HEAD-MOUNTED DEVICE UTILIZING THE SAME

(71) Applicant: Tobii AB, Danderyd (SE)

(72) Inventors: Kayla Kearns, Danderyd (SE); Louise Wändesjö, Danderyd (SE); Fredrik Norén, Danderyd (SE); Ola Glimåker, Danderyd (SE); Mårten Selin, Danderyd (SE)

(73) Assignee: Tobii AB, Danderyd (SE)

( * ) Notice: Subject to any disclaimer, the term of this patent is extended or adjusted under 35 U.S.C. 154(b) by 610 days.

(21) Appl. No.: 17/709,462

(22) Filed: Mar. 31, 2022

(65) Prior Publication Data

US 2023/0314797 A1    Oct. 5, 2023

(51) Int. Cl.
*G02B 27/00* (2006.01)
*G02B 27/01* (2006.01)

(52) U.S. Cl.
CPC ..... *G02B 27/0093* (2013.01); *G02B 27/0101* (2013.01); *G02B 2027/0138* (2013.01)

(58) Field of Classification Search
CPC .. G02B 27/01; G02B 27/017; G02B 27/0101; G02B 27/0172; G02B 27/0093; G02C 11/04; G02C 11/10; G06F 3/011; G06F 3/012; G06F 3/013; G06F 3/014
See application file for complete search history.

(56) References Cited

U.S. PATENT DOCUMENTS

| | | | |
|---|---|---|---|
| 10,613,323 B1 | 4/2020 | Wheelwright et al. | |
| 10,838,132 B1* | 11/2020 | Calafiore | G02B 6/0015 |
| 2015/0061995 A1 | 3/2015 | Gustafsson et al. | |
| 2020/0111259 A1* | 4/2020 | Sears | G02B 27/0172 |
| 2020/0341172 A1* | 10/2020 | Stevens | G02C 7/085 |
| 2020/0348753 A1 | 11/2020 | Lundberg et al. | |
| 2021/0116995 A1 | 4/2021 | Li et al. | |
| 2021/0278671 A1* | 9/2021 | Hsiao | G06V 20/20 |
| 2022/0335865 A1* | 10/2022 | Martin | G06F 3/013 |

OTHER PUBLICATIONS

European search report for Appl. Nr. 23 16 164770, completed on Aug. 25, 2023.

* cited by examiner

*Primary Examiner* — Sultan Chowdhury
(74) *Attorney, Agent, or Firm* — Christopher Ignatius Moylan (57) ABSTRACT

The invention is related to an assembly for an eye-tracking system, the assembly comprising a substantially ring-shaped carrier, a seat in the carrier, a plurality of light emitting devices disposed on a substrate, wherein the substrate is positioned against the seat, an alignment window comprising an opening extending through the carrier, an imaging device provided within and supported by the alignment window, wherein the imaging device is facing inwardly, and wherein the carrier is configured to guide light emitted from the plurality of light emitting devices towards an eye of a user when the assembly is used with the eye tracking system. The invention also relates to a corresponding head-mounted device utilizing the assembly.

11 Claims, 6 Drawing Sheets

ASSEMBLY FOR AN EYE TRACKING SYSTEM AND A CORRESPONDING HEAD-MOUNTED DEVICE UTILIZING THE SAME

TECHNICAL FIELD

The present invention relates to the field of eye tracking. In particular, the present disclosure relates to an assembly for mounting of components used in an eye tracking system, a corresponding head-mounted device utilizing the same.

BACKGROUND ART

There is a growing interest in augmented reality, AR, or virtual reality, VR, systems in various applications, including gaming, advertisement, medical, engineering, entertainment and more. These systems may also incorporate tracking of eye movements, eye tracking. Head-mounted devices, HMDs with eye tracking capabilities usually comprise light emitting devices, for example light emitting diodes, LEDs, targeting at least one eye of a user and at least one camera configured to register the corresponding eye images of the user's eye(s). In such systems, LEDs and the camera(s) that capture the images of the eyes are placed close to the eye(s).

Along with a general demand of a better quality of the eye tracking technology while keeping the manufacturing costs low, a user typically wants a slimmer and light-weight design of the HMDs. Hence, over the last decade, there have been improvements on how to mount the components in an HMD to satisfy customer's requirements.

Modern techniques within glint-based eye tracking utilize a separate mounting of individual components, such as a lens (or a system of lenses), at least one camera and a plurality of LEDs, during assembling. A known disadvantage of the prior art is this cumbersome process that is prone to misalignment of components. Another unfavourable condition of the prior art is that a prolonged active use of the HMDs results in components wear in terms of migration from the manufacturing calibrated positions. Moreover, since the glint-based eye tracking requires a plurality of LEDs, these are commonly fixated by a separate carrier, which increases a number of components and adds up to an increased cost, size and weight of the HMDs.

Accordingly, there exists room for improvement in terms of simplifying the manufacturing process of HMDs.

It is therefore the object of the invention to provide an assembly for an eye tracking system, and a head-mounted device utilizing the same. The present invention aims at improving a manufacturing process of HMDs.

STATEMENTS OF INVENTION

According to a first aspect, there is provided an assembly for an eye-tracking system, the assembly comprising:
a substantially ring-shaped carrier;
a seat in the carrier;
a plurality of light emitting devices disposed on a substrate, wherein the substrate is positioned against the seat;
an alignment window comprising an opening extending through the carrier;
an imaging device provided within and supported by the alignment window, wherein the imaging device is facing inwardly; and
wherein the carrier is configured to guide light emitted from the plurality of light emitting devices towards an eye of a user when the assembly is used with the eye tracking system.

Advantages of the invention include that multiple components are pre-assembled in one part that enables easy handling, a lightweight sleeker design and invisible components. Further, the advantages include ingress protection, i.e., protection of the electronic components by way of encapsulation of light emitting devices, an imaging device and wires against dust, solids and liquids in the assembly. Further advantageous aspects of the invention are covered by dependent claims.

In the assembly, the substantially ring-shaped carrier may have the shape with a varying local radius of curvature with respect to a geometric centre of the carrier.

In the assembly, the light emitting devices may be light emitting diodes, LEDs.

In the assembly, the light emitting devices may be disposed on a printed circuit board, PCB, wherein the substrate may be a strip of the PCB.

In the assembly, the substrate, on which the plurality of light emitting devices may be disposed, may comprise at least a top and bottom adhesive layer sandwiching a printed circuit board, PCB.

In the assembly, the carrier may be made of a near infra-red, NIR, transparent material.

The assembly may further comprise an optical filter adjacent to the imaging device. The optical filter allows the transmission of a specific wavelength or set of wavelengths of light and blocks the other portion.

The assembly may further comprise an optical filter adjacent to the imaging device such that the imaging device may be arranged behind the optical filter.

The assembly may further comprise a lens mounted in the carrier.

According to a second aspect, there is provided a head-mounted device comprising at least one assembly according to the first aspect of the invention, and further comprising a head-mounted display.

The invention provides for a new way of mounting of the separate components for an eye tracking system in a compact assembly, such that the migration of the components from the manufacturing calibrated positions during wear is limited or mitigated.

The effects and/or advantages presented in the present disclosure for embodiments of the assembly according to the first aspect may also apply to corresponding embodiments of the head-mounted device according to the second aspect.

BRIEF DESCRIPTION OF THE DRAWINGS

Specific embodiments will now be described in detail with reference to the accompanying drawings, in which:

FIG. 1b is an exploded view of the embodiment of FIG. 1a.

FIG. 2a is a top view of an assembly for an eye tracking system according to the embodiment of FIG. 1a;

FIG. 2b is a side view of the assembly for an eye tracking system according to the embodiment of FIG. 2a;

FIG. 3a is a partial perspective view of the assembly for an eye tracking system according to the embodiment of FIG. 1a;

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Aspects of the present disclosure will be described more fully hereinafter with reference to the accompanying drawings. Like numbers in the drawings refer to like elements throughout. The terminology used herein is for the purpose of describing particular aspects of the disclosure only and is not intended to limit the invention. As used herein, the singular forms "a", "an" and "the" are intended to include the plural forms as well, unless the context clearly indicates otherwise.

Figure 6:
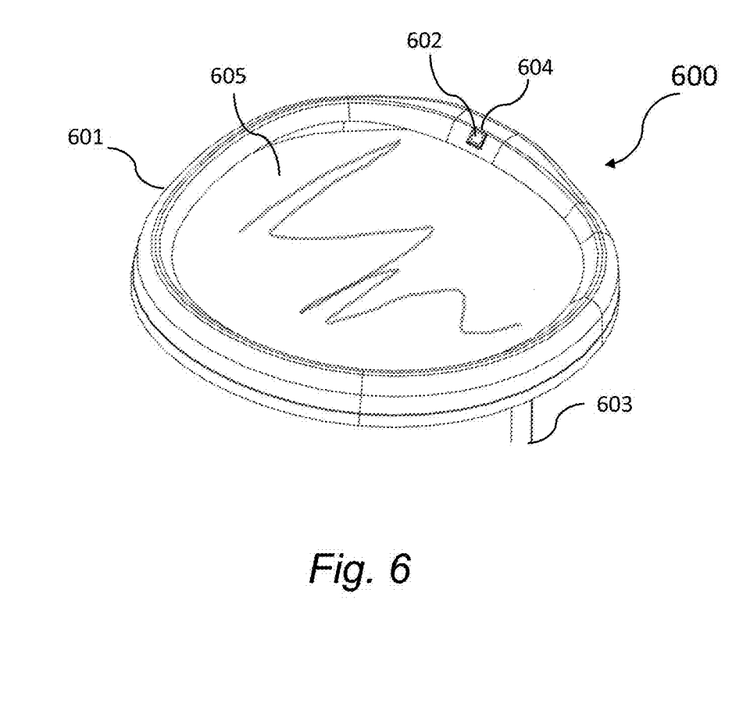
FIG. 6 is an example of the assembly according to an embodiment.

An example of an assembly 100 for an eye tracking system is described with reference to FIGS. 1a and 1b. The assembly 100 comprises a carrier 101, on which a plurality of components needed to facilitate eye tracking, are mounted. The carrier has a substantially ring-shaped form which in the depicted embodiment is a ring. Other substantially ring-shaped forms include, for example, an oval, a square with rounded corners, a donut, or a horseshoe, etc. In other words, the carrier may be described as a substantially annular frame, meaning that it does not have to be a full closed ring. Generally, a "frame" means a rigid structure formed of relatively slender pieces, joined so as to surround sizable empty spaces or non-structural elements and may be used as a support for other components. The carrier has an inner diameter and an outer diameter, such that the difference between the diameters may be attributed to a thickness, for example thickness t as shown in FIG. 2b. In further examples, the carrier may have a plurality of varying radii/diameters to describe its shape. In an example, the carrier has a curved top surface. The curved shape may be provided to guide light emitted from a plurality of light emitting devices towards an eye of a user when the assembly is used for eye tracking. The curved shape is chosen upon the required angle of incidence, angle of reflection and angle of refraction for a specific application. In some instances, the carrier is configured to surround a lens and has the inner diameter sized to surround the lens approximately circumferentially. For example, FIG. 6 shows an assembly 600 with a carrier 601 that surrounds circumferentially a lens 605. In other examples, the inner and outer diameters of the carrier may be sized to a lens cup, a lens housing or a glass/display in AR devices, and it can be optionally attached, for example by a removable or permanent connection of a head-mounted device.

Figure 1A:
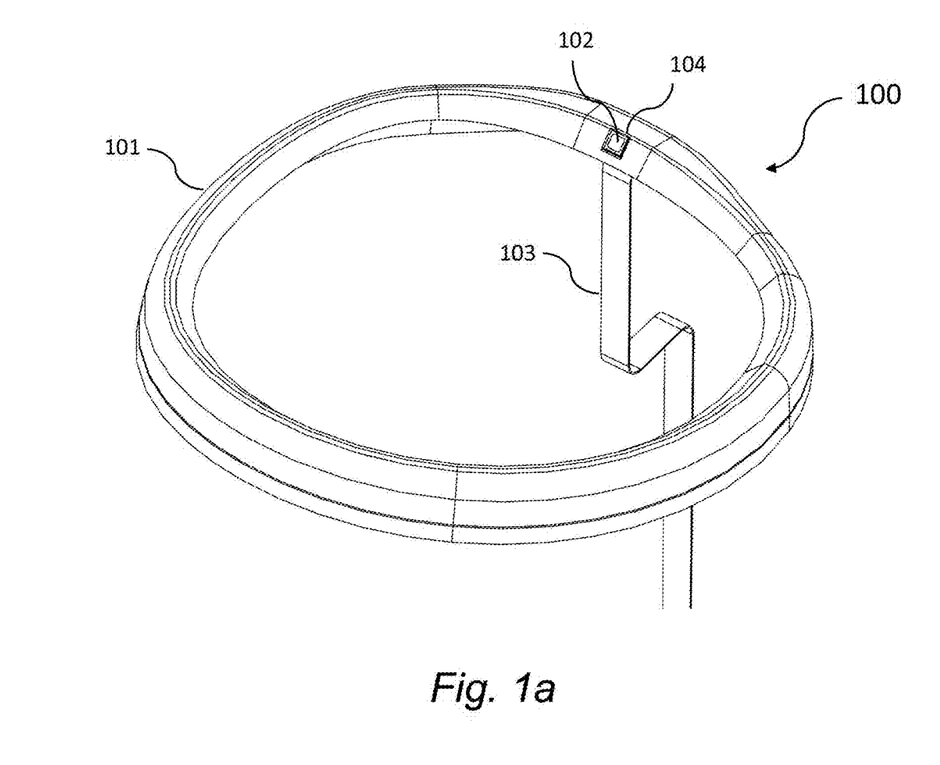
FIG. 1a is a front perspective view of an assembly for an eye tracking system according to an embodiment.
Figure 1B:
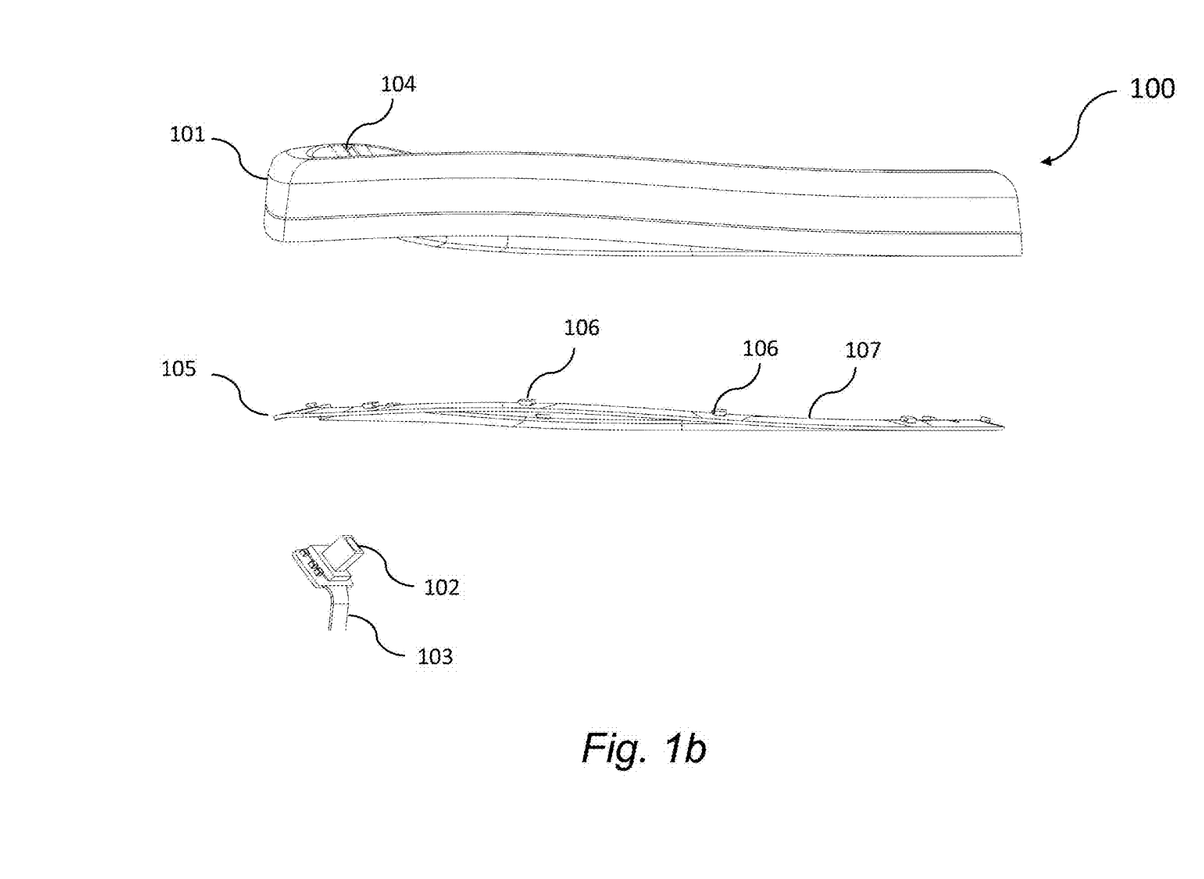

An illumination assembly 105, as shown in FIG. 1b, which is an exploded view of the embodiment of FIG. 1a. In FIG. 1a, the illumination assembly 105 is disposed within a seat (not shown) of the carrier 101. The seat may conform to the geometry of the assembly 100. The illumination assembly 105 comprises a plurality of light emitting devices 106 disposed on a substrate 107, wherein both the plurality of light emitting devices 106 and the substrate 107 being a part of the illumination assembly 105 are positioned or placed against the seat of the assembly 100. The light emitting devices 106 may be attached to the substrate by any type or number of permanent connection(s), such as being soldered, glued, etc. Further details of the illumination assembly 105 will be described in relation to FIG. 4 below.

In an embodiment, the light emitting devices 106 may be light emitting diodes, LEDs. In another embodiment, the light emitting devices 106 may be in a form of vertical-cavity surface-emitting lasers VCSELs. In yet another embodiment, the light emitting devices 106 are disposed on the substrate 107, wherein the substrate 107 is a printed circuit board, PCB. In other embodiments, the substrate 107 may be a flexible printed circuit, FPC. In other embodiments, the substrate 107, on which the plurality of light emitting devices 106 are disposed, is a strip of a printed circuit board, PCB. The term "strip" may be defined as a thin and narrow elongated piece, in this case the strip of the PCB. In the example embodiments, the substrate 107 provides the electrical connections for the distributed plurality of light emitting devices 106. The light emitting devices 106 emit light in a near infrared, NIR, wavelength range, such as, for example, about 740-950 nm, more preferably about 850-880 nm.

Figure 4:
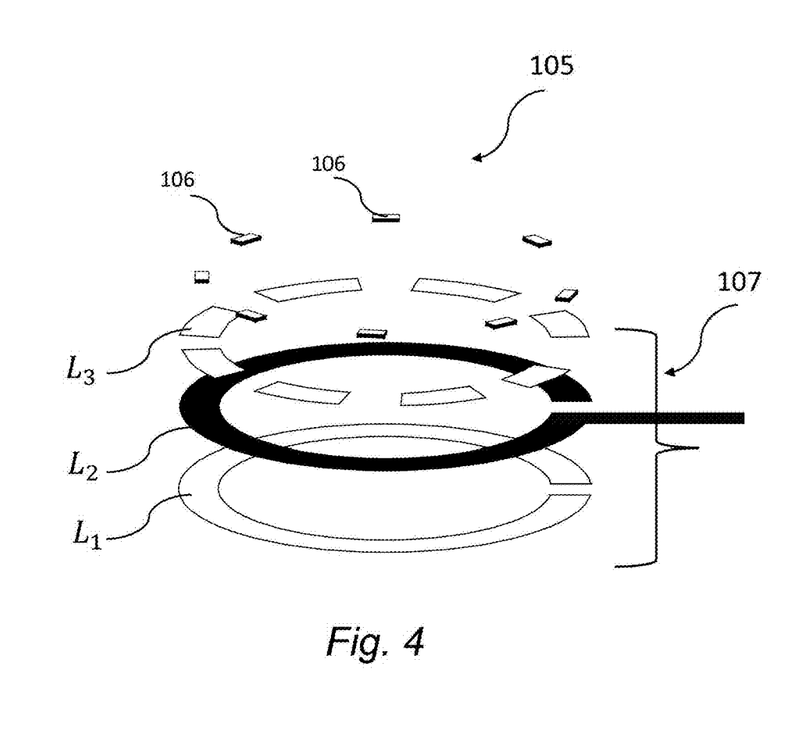
FIG. 4 is an example of an illumination assembly according to an embodiment.

An example of the substrate 107 is shown in an embodiment of FIG. 4. The substrate 107 is designed to follow a lens cup shape of an eye tracking system that the assembly 100 is intended to be used in. In other embodiments, the substrate may be designed to follow a lens housing used in an eye tracking system, for example in an HMD, or to follow a glass or display in AR devices. In the embodiment of FIG. 4, the substrate 107 comprises three layers ($L_1$-$L_3$). Starting from bottom to top, the substrate 107 comprises a bottom adhesive layer $L_1$, a two-layer flexible printed circuit board, FPC or flex PCB, $L_2$ and a top adhesive layer $L_3$. In other words, the FPC layer $L_2$ is sandwiched between the top and bottom adhesive layers $L_1$, $L_3$. In this example, the bottom adhesive layer $L_1$ is a foam adhesive layer. In other examples, the bottom adhesive layer $L_1$ can be any adhesive material with properties of being sticky or adherent within the seat of the assembly 100. In an example, the substrate may additionally and optionally comprise a stiffener layer, e.g., made of steel or any other rigid material. The optional stiffener layer provides for easier handling of the components but does not affect the overall performance of the substrate. It will be understood, that the FPC layer $L_2$ may be interchanged with a rigid PCB layer. In other embodiments, a different type of PCB may be used, such as a multilayer PCB, a single- or a double-sided PCB, a rigid-flex PCB, etc. The surface of the top adhesive layer $L_3$ in FIG. 4 is shown not to cover the entire top surface of the FPC layer $L_2$. In other words, the top adhesive layer $L_3$ consists of interruptions or dents at the positions on the top surface, where the plurality of light emitting devices 106 are disposed, which allows for light emitting devices 106 to be free of the adhesive layer. Similarly to the features of the bottom adhesive layer $L_1$, the top adhesive layer $L_3$ can be any adhesive material with properties of being sticky or adherent within the seat of the assembly 106. It should be understood that any alternative techniques, such as at least one of heat staking, use of fasteners, mechanical constraining, gluing, or a combination of those, may be utilized to fixate the illumination assembly 105 within the seat of the assembly 100.

In the example of FIG. 4, the substrate 107 comprising three layers ($L_1$-$L_3$) is 450 micrometres (μm) thick. In other examples, the substrate may be between 250-1600 micrometres (μm) thick. A provision of the adhesive layers on both sides of the FPC—that supplies electronic components and control circuits/wires to the light emitting devices 106—assists in compact mounting of the illumination assembly 105 in terms of precision, has a lightweight structure, is easy to position with high work efficiency and is a low cost component.

Figure 2A:
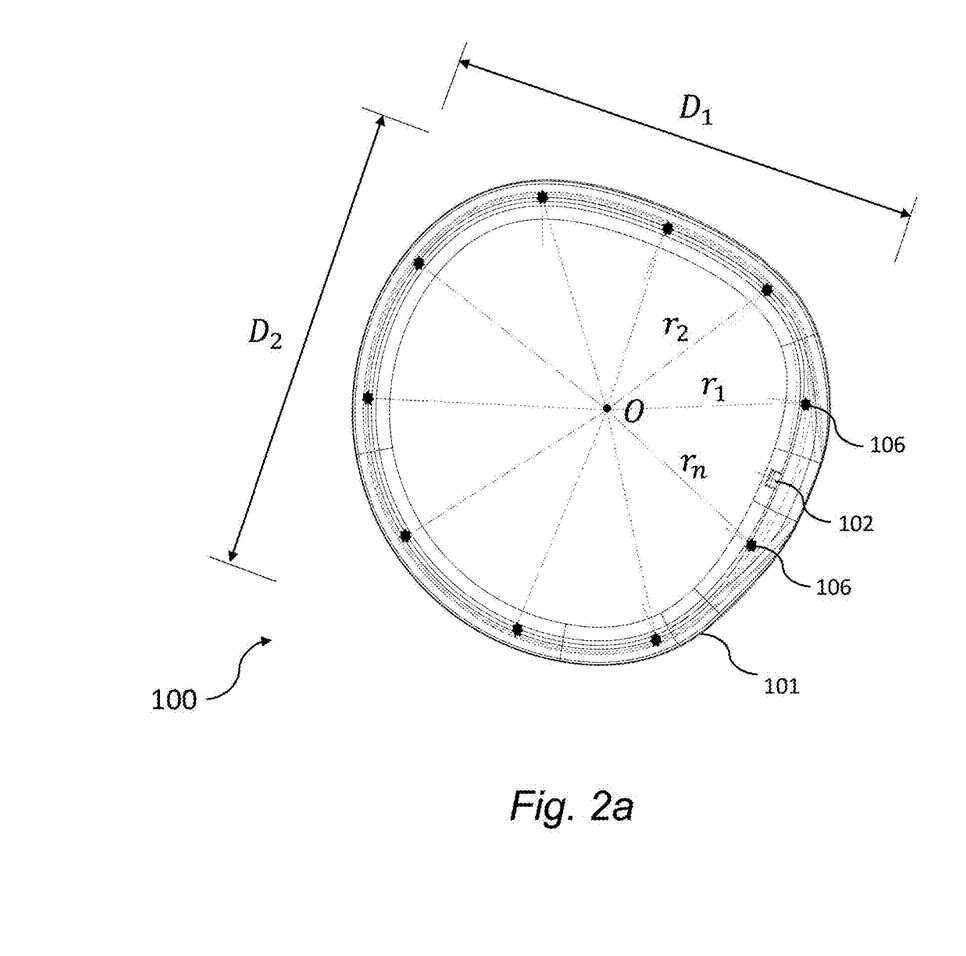
Figure 2B:
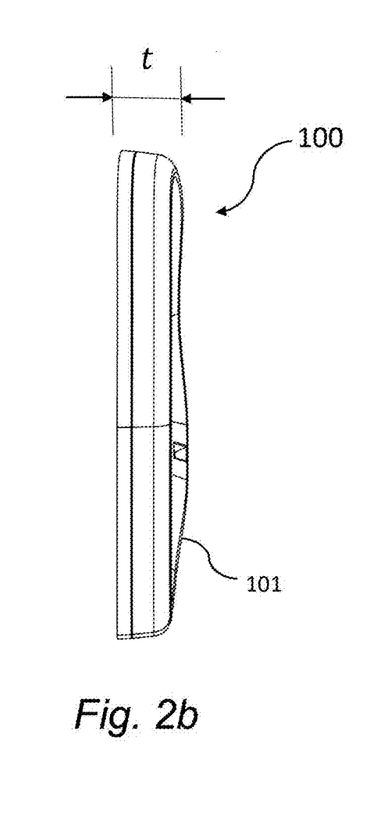

Reference is now made to FIGS. 1b and 2a, which show the plurality of light emitting devices 106 distributed on the substrate 107. FIG. 2a depicts positions of ten LEDs, shown with filled black star symbols, within the carrier 101 as seen from above. In this embodiment, each of the ten LEDs are positioned, substantially equiangularly with respect to to the carrier's 101 geometric center O and each other, i.e., with an angle between rays $Or_1$ and $Or_2$, as shown in FIG. 2a. The angle is substantially the same as the angles between all other pairs of neighboring rays. However, other examples may involve a different number of LEDs as well as there is no requirement to place LEDs equiangularly or equidistantly on the substrate. In the specific example of FIG. 2a, the number of LEDs and their relative positions with respect to each other is a result of optical simulations with optimization as to provide for an even illumination of the user's eye, when used in an eye tracking system. The simulations take into account the advantages of providing even illumination for a range of eye reliefs of 6-25 mm, the distance between the eye and the lens. Glint-based eye tracking methods rely on distinct reflections caused by a respective LED; hence, a skilled person would know how to optimize for a required illumination and gain highest quality of the images. The invention provides for a light distribution without obstructing the user's view.

Further, FIG. 2a describes the positions of the ten LEDs as being located at a respective distance $r_2 \ldots r_n$ (n=10 in this example). The distance $r_n$ is calculated with respect to a geometric centre O of the carrier 101. In this example, the carrier 101 is shown to have a toroidal body with thickness t, having a curved top surface, see FIG. 2b. FIG. 2a depicts that the carrier 101 is substantially ring shaped with a varying local radius of curvature and the carrier 101 has two diametric measures $D_1$ and $D_2$. In the examples of FIGS. 2a and 2b: $D_1$=51.33 mm, $D_2$=50.45 mm and t=7.65 mm. The invention is not limited by the example geometry of the carrier 101 in FIGS. 1a, 1b, 2a and 2b. The geometry of the carrier may be adapted to a shape of a lens cup or a lens housing used in an eye tracking system, for example in an HMD, or adapted to a shape of a glass or display in AR devices, in terms of the size (inner and outer diameters and thickness) and a contour of a toxoid, i.e., top and side surfaces.

Figure 3A:
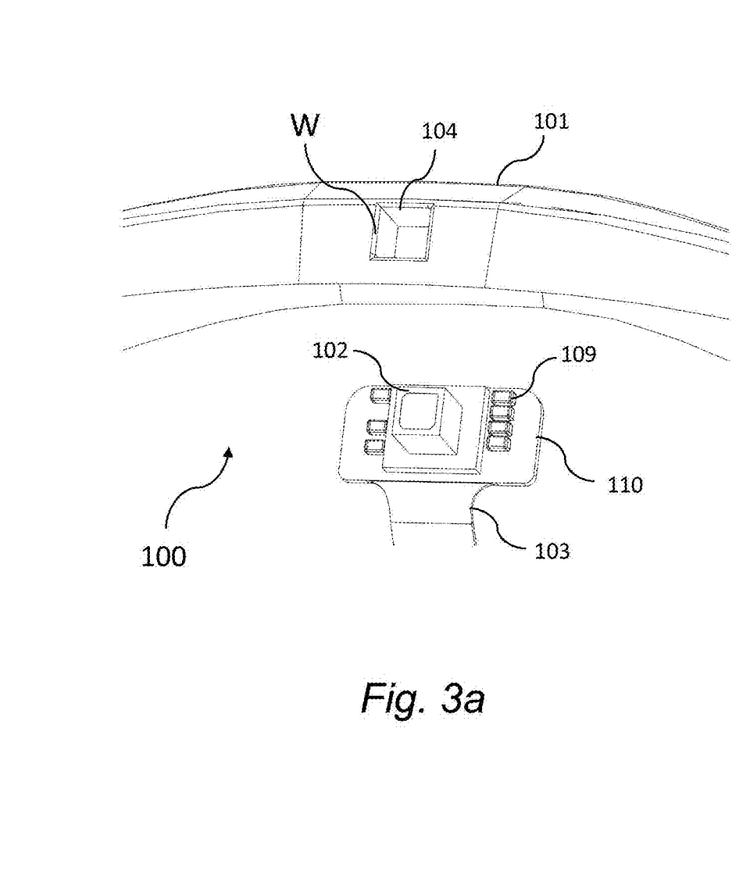
Figure 3B:
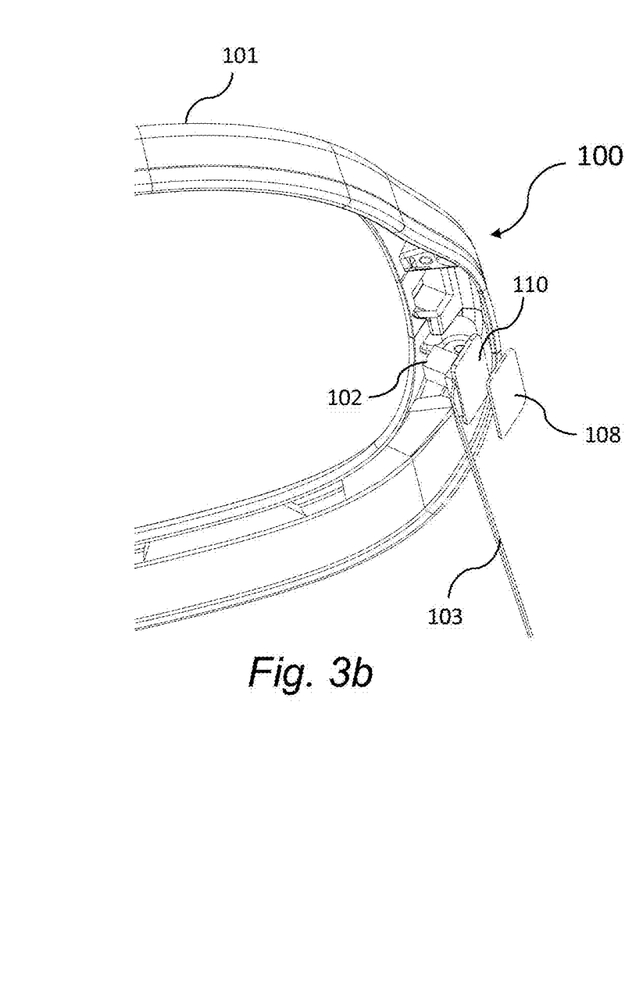
FIG. 3b is a view of the embodiment of FIG. 3a seen from below.

Now referring to FIGS. 1a and 3a-3b, an alignment window 104 is provided in the carrier 101, wherein the alignment window 104 comprises an opening extending through the carrier 101. The opening is sized to receive an imaging device 102. The imaging device 102 is provided within the alignment window. In other words; the imaging device 102 abuts against walls of the alignment window, i.e., it is supported by the alignment window. The walls (W) of the alignment window 104 are seen in the view of FIG. 3a. The imaging device inserted into the alignment window 104 is snugly fit therein. The term "snugly fit" may be defined as a fit of mechanical parts with no allowance, i.e., the closest fit that can be assembled by hand for parts that are not to move against each other. In other words, the imaging device is retained fixed within the carrier. The fitting arrangement of the imaging device in the alignment window mitigates the risks of misalignments during an assembling of the assembly's 100 components. The advantages of providing the assembly with the plurality of components needed to facilitate eye tracking mounted in one-piece on the carrier of the assembly include ingress protection, i.e., protection of the electronic components by way of encapsulation of light emitting devices, the imaging device and wires against dust, solids and liquids in the assembly. Further, it provides an advantage of limiting a possible movement of the parts with respect to each other during wear, which is known to be a major drawback in prior art devices.

Reference is further made to FIGS. 3a-3b. FIG. 3b depicts the carrier 101 as seen from below before the imaging device 102 (as seen from the back partly covered by a back side of a PCB plate 110) is slid into the alignment window 104. To facilitate easier handling and mounting of the image device 102, the imaging device 102 may be provided with a stiffener plate 108, depicted in the example of FIG. 3b. The stiffener plate 108 may be made of steel or any other rigid material suitable to provide a mechanical support. In turn, a number of electrical components 109, for example capacitors or any other components supporting operation of the imaging device 102, for the imaging device 102 may be arranged on the PCB plate 110. It can be seen in FIG. 3b, that the stiffener plate 108 is arranged behind the PCB plate 110, which is shown in an exploded view for better understanding. Other suitable arrangements would be known to a skilled person. A specific number of electrical components required for an imaging device may differ depending on the manufacturer of the imaging devices. The number of electrical components 109 is not essential for the current invention. The alignment window 104 not only provides a mechanical support to the imaging device 102 and enables its retention within the opening but also aids in positioning of the imaging device at a specific location within the carrier to ensure an optimal field of view (FOV) when used for eye tracking and minimizes alignment errors. FIG. 1a shows an example of an imaging device 102 mounted into the carrier 101, such that a front surface of the imaging device 102 is substantially flush with the top surface of the carrier 101. In another example, there may be provided a cover in front of the imaging device 102, such that a front surface of the cover is substantially flush with the top surface of the carrier 101. The cover provides protection to the imaging device 102 against mechanical impacts and similar wear, such as scratches, UV exposure, moisture, dust, etc. The cover may be an integral part of the carrier 101 or it may be a separate component. In an example, the cover may act as an optical filter to the imaging device 102. Further, as depicted on FIGS. 1a-1b and 3a-3b, the imaging device 102 is provided with electrical connection 103 to be operatively connected to the HMD. The electrical connection 103 and the PCB plate 110 in this example is a flexible printed circuit board. In other examples, a different type of PCB may be used, such as a multilayer PCB, a single- or a double-sided PCB, a rigid-flex PCB, etc.

In an arrangement according to the invention, the alignment window 104 provides for an orientation of the imaging device required for an eye tracking, such that the imaging device 102 is facing inwardly. In the example of FIGS. 1a-1b and 3a-3b, the imaging device 102 is facing inwardly towards a geometric centre (O) of the carrier 101. A "geometric centre" generally means a centroid of a structure. It will be understood that other embodiments may include further modifications to alternative orientations of the imaging device within the assembly.

Figure 5:
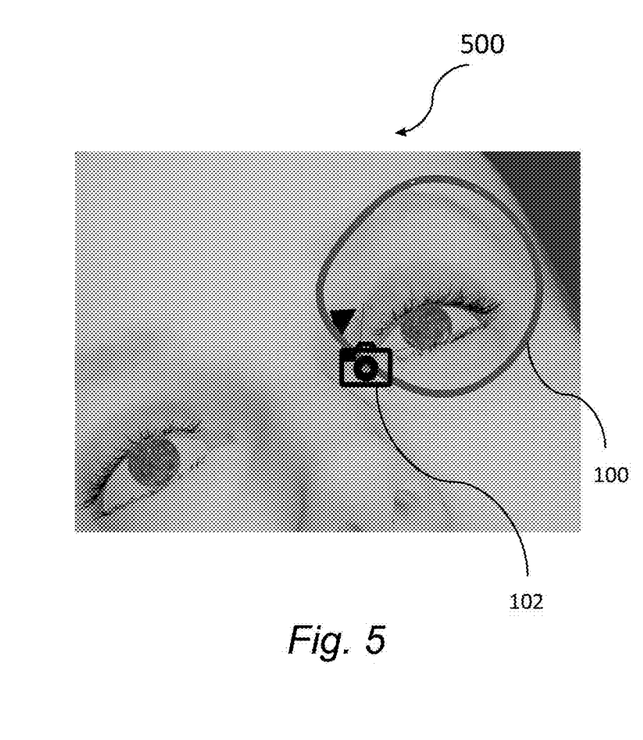
FIG. 5 is an example of a relative orientation of the assembly according to one or more embodiments with respect to a user.

The orientation of the imaging device 102 with respect to the carrier 101 is chosen on the basis of providing the optimal FOV when used for an eye tracking, To better describe the intended use, an example 500 is shown in FIG. 5, where the assembly 100 is shown to be arranged in front of an eye of a user, where the imaging device 102 is exaggerated to show the relative position with respect to the eye of the user. In this particular example, the imaging device's 102 field of view are: diagonal field of view, DFOV, is 118°, horizontal field of view, HFOV, is 88°, vertical field of view, VFOV, is 88°. It will be understood that FOV will be different for different applications and the invention is not limited to a particular range of FOVs. By using the assembly 100 with such relative position of the imaging device 102 within the carrier 101 ensures the optimal FOV and provides mechanical constraints to an alignment of the components in the assembly 100, such that a separate hardware calibration for each HMD unit is not required, which simplifies the use of an eye tracking system in which the assembly 100 is to be used. Correct positioning of the imaging device and the light emitting devices allows the accurate detection of eye movements, of a user. It will be understood that the figures show an example geometry of the assembly 100 with a relative position of the components adapted for a left eye of a user. A corresponding design adapted for a right eye of a user will have a mirrored image by 180 degrees. In other examples, there may be two or more imaging devices with a respective alignment window in the carrier.

The imaging device 102 or an image sensor may for example be a camera such as a complementary metal oxide semiconductor (CMOS) camera or a charged coupled device (CCD) camera. However, the imaging device 102 can be any other type of imaging device, including light sensors etc.

Optionally, the assembly 100 may comprise an optical filter (not shown) adjacent to the imaging device 102, In such an example, the imaging device 102 may be arranged behind the optical filter. The optical filter may be the cover as discussed in relation to FIG. 1a. Alternatively, the optical filter may be integrated into the imaging device 102. The optical filter allows the transmission of a specific wavelength or set of wavelengths of light and blocks the other portion. The optical filter may, for example, block the visible light and allow the transmission of the NIR light, Preferably, the optical filter may be a bandpass filter centered around an illuminator spectrum.

The carrier 101 guides light emitted from the plurality of light emitting devices 106 towards an eye of a user when the assembly is used with the eye tracking system. The carrier is made of a material that has different spectral properties in a visible and a near-infrared (NIR) light, and which is transparent in NIR wavelength range. For example, the material may be NIR transparent in that it has more than 90% transmission in a spectral range 800 nm-1000 nm. Preferably, the material would have a low haze, for example less than 0.5%, according to a standard ASTM D1003 for the same spectral range. Additionally, the material may appear visually black, i.e., having less than 10% transmission in spectral range 400 nm-700 nm. These specifications depend on the material itself and on a thickness of the carrier 101 in front of the LEDs 106. The carrier can be made from a material such as a polycarbonate plastic, for example with low viscosity UV stabilized grade, to ensure easy processing, i.e., malleable. Other examples would include materials selected from the group consisting of, but not limited to, thermoplastic polymers suitable for injection-molding. It allows for easy manufacturing, for example by injection moulding or any other suitable method known to one of ordinary skill, Thanks to the optical properties of the material for the carrier and being placed close to the user's eyes, the user does not notice it as a separate component of the HMD and the FOV is not obstructed. The invention is not limited to a specific material and other suitable materials would be known for one of ordinary skill such that to maximize transmission in a specified wavelength range from the LEDs covered by the material of the carrier, while ensuring the minimization of reflection and absorption.

The intrinsic features of the carrier having a top surface of optical quality and a combination of both a refractive index and a thickness of the carrier 101 in front of the LEDs facilitate the carrier itself to perform as an optical lens. In this context, "optical quality" means that the material has specifications according to ISO 10110 standard in terms of scratch/dig, bubbles/inclusions, birefringence, refractive power based on refractive index and radius of curvature or wedge shape. In other words, the carrier is configured to guide at least a part of the light emitted by LEDs towards an eye of a user when the assembly is used with the eye tracking system. The light distribution is even and the assembly 100 does not obstruct the user's view. At the same time, the assembly functions as a mechanical carrier for the described components. The assembly is easy to manufacture, easy to handle, is lightweight, provides ingress protection for eye tracking components in the assembly against dust, solids and liquids when used in an eye-tracking system, e.g., an ingress or gap between the lens and the lens cup, and minimizes the effects of wear.

FIG. 6 discloses an embodiment of assembly 600 with features similar to those of FIG. 1a. However, in this figure, an additional feature of the lens 605 can be seen. The lens 605 is mounted in the carrier 601.

Figure 7:
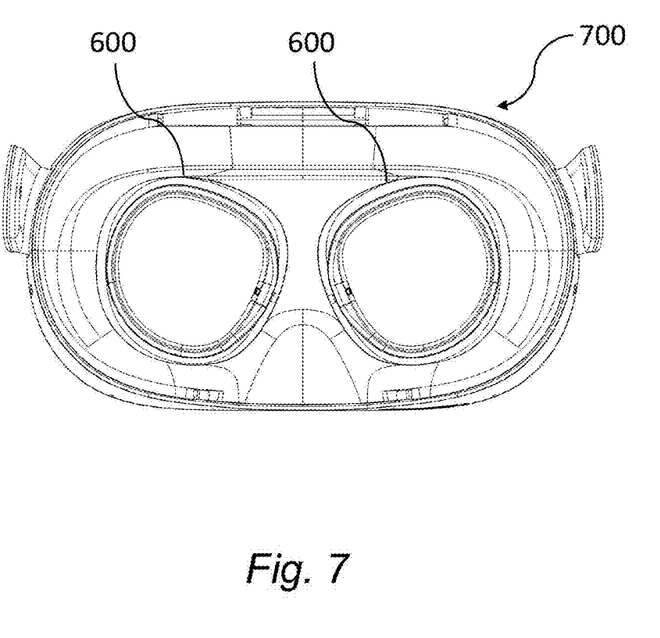
FIG. 7 is an example of a head-mounted device according to an embodiment.

The disclosed elements in the figures may form part of a head-mounted device, HMD, i.e., a wearable headgear worn by the user or adapted to be arranged at a head of a user. FIG. 7 schematically describes a head-mounted device 700. For example, the HMD may comprise a display adapted for a virtual reality, VR, an augmented reality, AR, and/or a mixed reality, MR, application or collectively called an extended reality, XR, headset. The display may show a plurality of objects as a result of a control signal from a computer. The display may be transparent such that the user can also view the real world for AR experiences or non-transparent for VR experiences. For example, the display may be a three-dimensional (3D) display such as a stereoscopic display or a volumetric 3D display being either autostereoscopic or automultiscopic, which may indicate that they create 3D imagery visible to an unaided eye, without requiring stereo goggles or stereo head-mounted displays. Consequently, the 3D display may be part of the head-mounted device. It is also known that the head-mounted device with eye tracking features usually comprises an eye tracking sensor (such as an imaging device or any other suitable sensor), a processor, and a memory containing instructions executable by the processor. These features are well-known for one of ordinary skills.

In a general example, the display (lens cup or other) is positioned close to the eye, such as for example in FIG. 5, in order to enable centralisation in respect to a pupil. If the head-mounted device of general type, i.e., with no eye tracking, is to be adapted to include the features of eye tracking, such as to include a gaze tracking signal using one or more eye tracking sensors indicative of a pupil position, a pupil size, a gaze direction and/or a convergence distance, the assembly according to the first aspect of the invention may be integrated. An eye tracking system may further utilize signal processing in order to monitor attention, drowsiness or the like of the user. By arranging the assembly embodiments of the present disclosure, accurate eye tracking can be performed. For example, FIG. 7 shows the HMD 700 with two assemblies 600. The accurate eye tracking is achieved by even illumination for the user's eye and the relative position of the imaging device within the assembly, which maximizes the FOV. The assembly provides eye tracking features to an HMD that would otherwise not have such features.

The assembly's structure may have various shapes depending on the shape of an interior the HMD providing for an easy adaptation to a variety of eye-tracking systems, including AR/VR/MR headsets, glasses, helmets, etc.

The invention claimed is:

1. An assembly for an eye-tracking system, the assembly comprising:
   a substantially ring-shaped carrier;
   a seat in the carrier;
   a plurality of light emitting devices disposed on a substrate, wherein the substrate is positioned against the seat;
   an alignment window comprising an opening extending through the carrier;
   an imaging device provided within and supported by the alignment window, wherein the imaging device is facing inwardly; and
   wherein the carrier is configured to guide light emitted from the plurality of light emitting devices towards an eye of a user when the assembly is used with the eye tracking system.

2. The assembly according to claim 1, wherein the substantially ring-shaped carrier has the shape with a varying local radius of curvature.

3. The assembly according to claim 1, wherein the light emitting devices are light emitting diodes, LEDs.

4. The assembly according to claim 1, wherein the light emitting devices are disposed on a printed circuit board, PCB.

5. The assembly according to claim 4, wherein the substrate is a strip of the PCB.

6. The assembly according to claim 4, wherein the substrate, on which the plurality of light emitting devices are disposed, comprises at least a top and a bottom adhesive layer sandwiching the PCB.

7. The assembly according to claim 1, wherein the carrier is made of a near infra-red, NIR transparent material.

8. The assembly according to claim 1, wherein the assembly further comprises a cover adjacent to the imaging device.

9. The assembly according to claim 1, wherein the assembly further comprises an optical filter adjacent to the imaging device such that the imaging device is arranged behind the optical filter.

10. The assembly according to claim 1 further comprising a lens mounted in the carrier.

11. A head-mounted device, HMD, for extended reality, XR, applications, the device comprising at least one assembly according to claim 10, and a head-mounted display.

* * * * *